United States Patent
Achuthan et al.

(10) Patent No.: US 6,556,668 B1
(45) Date of Patent: Apr. 29, 2003

(54) CONSUMER CONTACT TOLL OPTIMIZER

(75) Inventors: Ramesh Achuthan, Denver, CO (US); Michael A. Bland, Boulder, CO (US); Jeffrey Chu, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/563,129

(22) Filed: May 2, 2000

(51) Int. Cl.[7] .............................................. H04M 15/00
(52) U.S. Cl. ............................ 379/114.01; 379/114.03; 379/114.05; 379/114.09; 379/210.01; 455/405; 455/406
(58) Field of Search ........................... 379/111, 112.01, 379/114.01, 114.02, 114.03, 114.05, 114.09, 210.01; 455/405, 406, 407, 408

(56) References Cited

U.S. PATENT DOCUMENTS

| | | | | |
|---|---|---|---|---|
| 5,146,491 A | * | 9/1992 | Silver et al. ........... | 379/114.01 |
| 5,303,297 A | * | 4/1994 | Hillis | |
| 5,566,236 A | * | 10/1996 | McLampy et al. ...... | 379/201.01 |
| 6,088,430 A | * | 7/2000 | McHale ................... | 379/93.28 |

* cited by examiner

Primary Examiner—Binh Tieu
Assistant Examiner—Quoc Tran
(74) Attorney, Agent, or Firm—Sheridan Ross P.C.

(57) ABSTRACT

An consumer contact toll optimizer providing for the automatic disconnection and reconnection of communication links between communications devices and/or services is provided. The system allows communication links to be terminated before a specified period of time has elapsed, thereby allowing consumers of communications services charging on a time of use basis to minimize the charges incurred while using such services. In particular, the present invention allows consumers to minimize fees in connection with communications networks that charge at a first, lower rate for an initial period of time, and a second, higher rate for subsequent periods of time. The present invention is particularly well-suited for use in connection with wireless telephones having service plans that do not charge for the first incoming minute of a telephone call, and in connection with long distance service plans that charge a lower rate for an initial period of time and a higher rate for a subsequent period of time.

19 Claims, 3 Drawing Sheets

CONSUMER CONTACT TOLL OPTIMIZER

FIELD OF THE INVENTION

The present invention relates to voice and data communications conducted over a communications channel, the use of which is charged for on a time of use basis.

BACKGROUND OF THE INVENTION

Many telecommunications services are charged to the consumers of such services on a time of use basis. For example, cellular telephone communications are typically billed according to the number of minutes used. Similarly, long distance telephone calls are generally billed by the long distance provider on a time of use basis.

Many telecommunications service providers charge consumers different rates, depending on the total amount of time that the provided communication channel has been in use. For example, many cellular telephone service providers do not charge subscribers of the service for the first minute of a call placed to the subscriber's cellular telephone. As another example, many long distance service providers charge a first rate for each minute of use up to a defined limit, and a second rate for each minute of use in excess of that defined limit. Generally, the per minute rate within the first period is less than the per minute rate during the second period.

In general, cellular telephone providers offer the first minute of an incoming call free to address subscriber concerns that they will be charged for telephone calls mistakenly placed to their cellular telephone, or for uninvited calls from, for example, solicitors. Long distance providers generally charge more per unit time after a certain call length has been exceeded to encourage users to free up circuits. In addition, such a tiered billing scheme allows the long distance providers to advertise lower rates, while realizing higher profits from heavy users of the service.

In order for a consumer to take advantage of the free or lower cost rates available from some service providers, the time of use must typically be monitored manually. Although automatic call timers are available, for example, with certain models of telephones, such timers simply provide an indication of when the time specified by the user has expired, or terminates the telephone call. However, no conventional system automatically reestablishes a connection between the subscriber and the party or service with which the subscriber was previously communicating.

SUMMARY OF THE INVENTION

The present invention is directed to solving these and other problems and disadvantages of the prior art. Generally, according to the present invention, the amount of time that a communication channel between a first party and a second party or a service has been in place is monitored. After a specified amount of time has elapsed, the communication channel is broken. According to the present invention, a connection between the first communications device and the second communications device or service is then automatically reestablished. In this way, toll charges accrued by the users of the communication channel can be minimized or eliminated.

According to one embodiment of the present invention, a communication channel is established between a subscriber of a communications service and the service. The subscriber registers with the communications service a desire to communicate according to the present invention. The communication channel is then immediately terminated. Following termination of the communication channel, a communication channel between the subscriber's communications device and the communications service is automatically reestablished by a telephone call from the server of the communications service to the communications device. Information, such as voice messages or data stored on the server, may then be transmitted to the subscriber's communications device over the communication channel. After a predetermined amount of time has elapsed, the connection between the communications service and the communications device is automatically terminated by the server. If information remains to be transmitted from the server to the communications device, the communications service again establishes a communication channel with the subscriber's communications device to continue transmitting information. This continues until all of the information has been transmitted to the subscriber's communications device, or the subscriber terminates the exchange of information.

According to another embodiment of the present invention, a communication channel is established between two communications devices. At least a first of the communications devices may be provided with an apparatus according to the present invention for minimizing or eliminating communication charges. Accordingly, the first communications device may automatically terminate a connection placed to the second communications device after a predetermined amount of time has elapsed. The first communications device may then immediately reestablish communications with the second communications device, to allow a transfer of information between the devices to be continued.

These and other advantages and features of the invention will become more apparent from the following description of illustrative embodiments of the invention taken together with the drawings.

DETAILED DESCRIPTION

Figure 1:
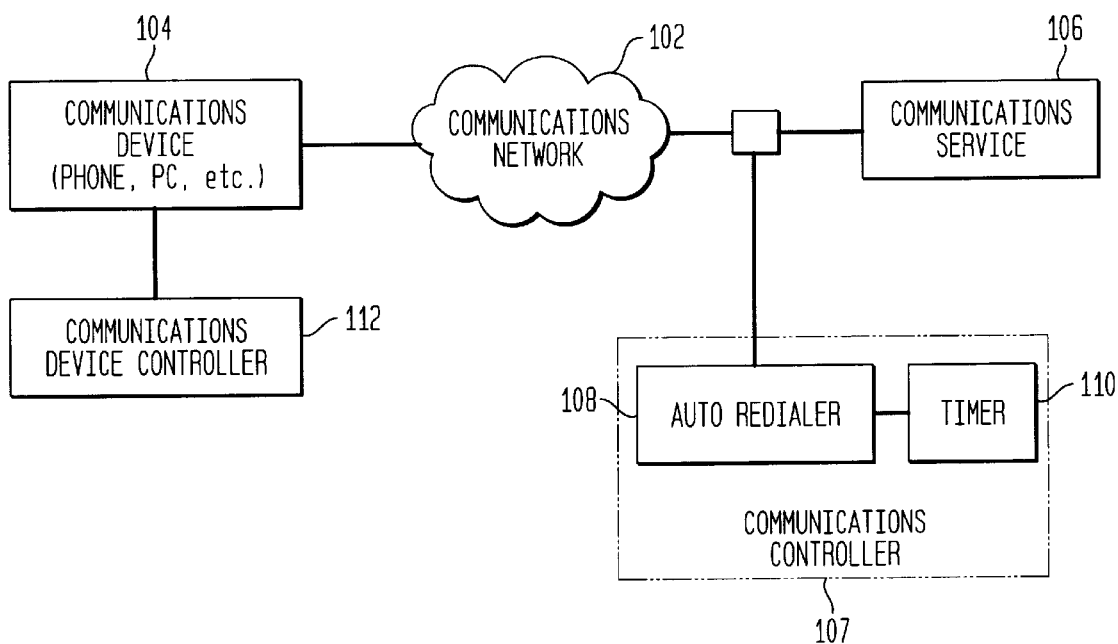
FIG. 1 is a block diagram of a communications network having economizing features according to an embodiment of the present invention.

FIG. 1 illustrates a communications system 100 having economizing or toll optimizing features according to the present invention. The system 100 generally includes a communications network 102, a communications device 104, a communications service 106, and a communications controller 107. The communications controller 107 generally comprises an autoredialer 108, and a timer 110. According to one embodiment of the present invention, the system 100 may additionally include a communications device controller 112.

The communications network 102 may include the public switched telephony network (PSTN), a private branch exchange (PBX), a computer local area or wide area network, such as the public Internet or a private intranet, or a wireless communications service. In addition, the communications network 102 may comprise any combination of these or other particular communications networks. Generally, at least one of the particular communications networks making up all or part of the communications network 102 will charge users on a time of use basis.

The communications device 104 may comprise a telephone, a wireless telephone, a personal computer, a personal digital assistant (PDA), or any other device suitable for transferring information using a communications network 102. Generally, the communications device 104 is operated by a user desiring to establish communications with a communications service 106 using a communications network 102 that charges the user of the communications device 104 on a time of use basis.

The communications service 106 may comprise any service capable of communicating with a communications device 104 over a communications network 102. Accordingly, the communications service may include any type of communications server, such as an interactive voice response (IVR) server, a voice messaging server; or other communications service, such as one having live operators.

The autoredialer 108 of the controller 107 may be associated with the communications service 106 to control operation of the communications service 106 as will be described below. According to one embodiment, the autoredialer 108 comprises a software module integral to the controlling software of the communications service 106. According to another embodiment, the autoredialer 108 is part of a controller 107 apparatus having a processor and memory containing suitable programming. The autoredialer 108 generally controls the connection between the communications device 104 and the communications service 106 across the communications network 102. Therefore, the autoredialer 108 may sever the connection across the communications network 102, and reestablish communications across the communications network 102 after a previous connection has been severed.

The timer 110, associated with the autoredialer 108 may be implemented in any one of a number of ways. Generally, the timer 110 is implemented as a software module within the autoredialer 108 software. The timer 110 may also comprise a separate apparatus interconnected to the autoredialer 108. The timer 110 generally monitors the amount of time that a connection between the communications device 104 and the communications service 106 has existed across the communications network 102. The timer 110 may provide this time of connection information to the autoredialer 108 to allow the autoredialer 108 to sever a connection after a predetermined amount of time has elapsed. Alternatively, the timer 110 may trigger a signal that is communicated to the autoredialer 108 after a predetermined amount of time has elapsed.

The communications system 100 may also include a communications device controller 112 associated with the communications device 104. The communications device controller 112 may comprise a processor and associated memory for running a communications device control program to perform functions associated with use of the autoredialer 108. For example, the controller 112 may automatically answer a request to establish a communications link placed by the autoredialer 108 to the device 104, and may suppress notification of the request. Where the communications device 104 is a telephone, the suppression of notification of a request to establish a connection may include disabling the ringing function normally performed by the communications device 104 to indicate an incoming call. The controller 112 may also include additional functions, as will be described in greater detail below. According to one embodiment, the controller 112 is implemented as programming code resident in the control circuitry of the communications device 104 itself.

According to one embodiment of the present invention, a communications device 104 or a communications service 106 having access to multiple lines in the communications network 102 may selectively engage those fines to reduce latency between disconnection of a communications link and reestablishment of a fink. In addition, the time required to initiate functioning of the autoredialer 108 may be minimized, in order to limit the amount of time that an initial connection between the communications device 104 and the communications service 106 needs to be in place. Accordingly, as soon as the communications service 106 has the information necessary to utilize the autodialing function, it can disconnect service, and immediately reestablish a connection. In a further embodiment, the communications controller 107 may be provided with the ability to preserve an application session across multiple call backs. For example, interactive voice response scripts being transmitted from the communications service 106 to a communications device 104 may pause while one communications link across the communications network is disconnected and another is established. Similarly, data transmissions and the like may be paused during any delays associated with the disconnection of communications links. According to yet another embodiment, the communications controller 107 may be provided as a service available to users of devices 104 on a subscription basis to reduce or eliminate charges for use of the communications network 102.

Figure 2:
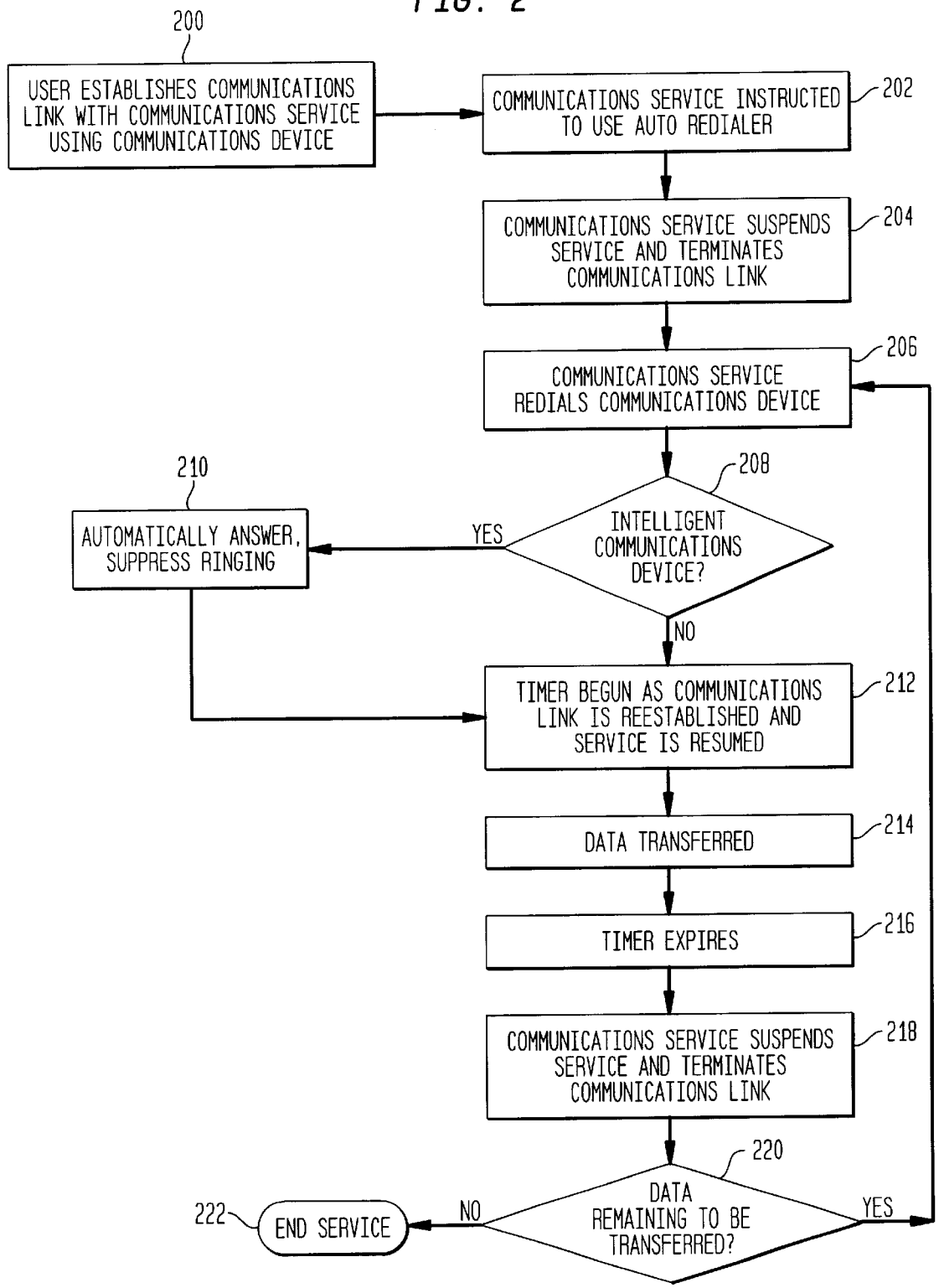
FIG. 2 is a functional flow diagram of the operation of a system according to an embodiment of the present invention.

With reference now to FIG. 2, the operation of the system 100 according to an embodiment of the present invention begins with the establishment of a communications link between the communications device 104 and the communications service 106 (step 200). Generally, the establishment of a communications link 200 between a communications device 104 and the communications service 106 is initiated by the user of the communications device 104.

At step 202, the communications service 106 is instructed to use the autoredialer 108 in communicating with the communications device 104. These instructions may be submitted to the communications service 106 in a variety of ways. For example, the communications service 106 may present a menu to the user of the communications device 104, from which use of the autoredialer 108 may be selected. The menu may also allow the user of the communications device 104 to select the maximum time period for which a communications link is to be maintained. Alternatively, use of the autoredialer 108 in connection with the communications service 106 may be stored in memory associated with the communications service 106 during an initial user set up. Accordingly, the user may specify a maximum time period for any individual communication with the communications device 104 for use whenever the user instructs the communications service 106 to use the autoredialer 108 function. Alternatively, the communications service 106 may recognize the communications device 104 when communications are initially established using automatic number identification (ANI) or other identification means, and associating the communications device 104 with preset autodialer preferences. As a further embodiment, the communications service 106 may automatically enter an economizing autoredialer mode upon entry of an account number by the user of the communications device 104 having associated with it preset autoredialer preferences.

Use of an autoredialer 108 associated with a communications service 106 may also be initiated by instructions communicated from the user of a communications device 104 to an operator associated with the communications service 106. The operator may then initiate the autoredialer 108 function to control the time that an individual communication link is in place between the communications device 104 and the communications service 106 before being broken. The operator may also serve as the autoredialer 108 by manually performing the functions of the autoredialer 108 described in greater detail below.

As yet another method for instructing the communications service 106 to use an autoredialer 108 function, the communications device 104 may transmit a machine readable code to the communications service 106, instructing the communications service 106 to use the autoredialer 108 functions, and to specify parameters associated with the use of that function. These instructions may be transmitted as part of an in-band or out-of-band signal.

Where the provider of a communication link used by the communications device 104 does not charge for, for example, the first minute of incoming calls, it is desirable for the initial communication link between the device 104 and the service 106 to be terminated as soon as possible. Therefore, according to an embodiment of the present invention, at step 204 the communications service 106 suspends service and terminates the communication link upon receiving the user's full instructions regarding use of the autoredialer 108, including a call back number. After terminating the communication link, the communications service 106 immediately redials the communications device 104 at step 206. Depending on the type of communications network 102 used to connect the communications device 104 and the communications service 106, the time required to reestablish a communication link can be as little as a fraction of a second. For example, an integrated services digital network (ISDN) communications network 102 may require only about half a second between termination of a connection, and reestablishment of that connection. Where the communications network 102 comprises at least in part the public switched telephony network, the delay between termination of a connection and reestablishment of that connection generally must be one second or longer.

Where the communications device 104 is associated with a communications device controller 112, and there is an intelligent communications device 104 (step 208), the communications device 104 may automatically answer a request to establish a connection and may suppress notification of the request (step 210) made by the communications service 106. Where the communications device 104 is a telephone, this may comprise suppressing the ring normally associated with such a request. In general, the communications device 104 may register the commencement of autoredialer 108 controlled communications in the device controller 112, and suppress new call notification when a call is received from the communications service 106. In this way, a user may, for example, continue to hold the communications device 104 to his or her ear when using the autoredialer function, without having the communications device 104 ring loudly. The communications device 104 may recognize the communications service 106 through, for example, automatic number identification. The automatic answering and the suppression of ringing 210 in combination with the automatic redialing 206 may allow information to be transferred between the communications device 102 and the communications service 106 with little interruption or delay apparent to the user.

Upon the reestablishment of a communication link between the communications device 104 and the communications service 106, the timer 110 is begun (step 212). For example, when used in connection with a communications network 102 offering the user of a communications device 104 a rate plan according to which the first incoming minute is free, the timer 110 will generally count up to some period of time less than one minute, and issue an alarm. Generally, the full time period at which a lower rate is offered is not used, to allow for the time required to tear down an established communication link.

After the communication link has been reestablished, data may be transferred (step 214). As mentioned above, the timer expires (step 216) generally at some amount of time slightly less than the maximum time period during which a lower rate is charged. Upon expiration of the timer 110 (step 216), the autoredialer 108 directs the communications service 106 to suspend service and sever the communication link (step 218).

If data remains to be transferred (step 220), the autoredialer 108 redials the communications device 104 (step 206), the timer 110 is reset (step 212), data is transferred (step 214), and the communications service 106 is again suspended upon expiration of the timer 110 (steps 216 and 218). This continues until the data transfer has been completed, to provide a virtually continuous link, while minimizing or eliminating charges for use of the communications network 102. Where no more data remains to be transferred, or if the user of the communications device 104 manually terminates the connection, the service ends 222.

In an alternative embodiment, preferences regarding the length of time that communications between the communications device 104 and the communications service 106 should be maintained need not be transmitted to the autoredialer 108 associated with the communications service 106. Instead, a device controller 112 associated with the communications device 104 may automatically terminate the connection after the desired period of time has elapsed. By registering with the autoredialer 108, the autoredialer 108 may be instructed to redial the communications device 104 automatically. In this way, a virtually continuous communications link maybe maintained between the communications device 104 and the communications service 106 until the user directs the autoredialer 108 to discontinue the automatic redialing, such as by transmitting a specified signal to the autoredialer 108.

Figure 3:
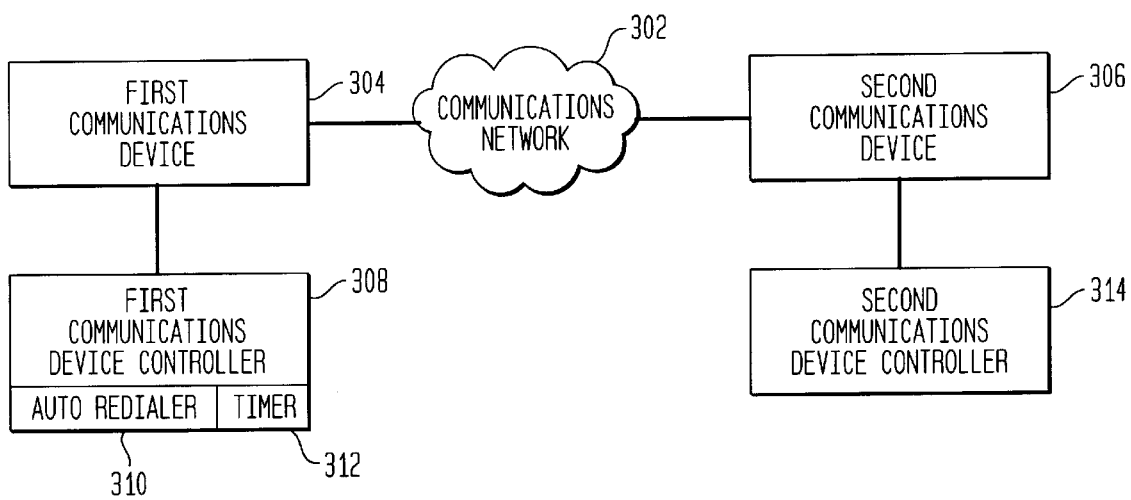
FIG. 3 is a block diagram of a communications network having economizing features according to another embodiment of the present invention.

With reference now to FIG. 3, a further embodiment of the present invention is illustrated. The system 300 generally includes a communications network 302, a first communications device 304, and a second communications device 306. Associated with the first communications device 304 is a first communications device controller 308. The first communications device controller 308 generally includes an autoredialer 310 and a timer 312. The second communications device 306 may have associated with it a second communications device controller 314.

Generally, the system 300 allows users of the first communications device 304 and the second communications device 306 to communicate while incurring reduced toll charges. For example, the user of the first communications device 304 may place long distance telephone calls over a communications network 302 offering reduced rates for the first 20 minutes that a connection is established. Accordingly, the user of the first communications device 304 may wish to limit the time that any one connection is in place to 20 minutes or less. Thus, according to the embodiment of the present invention illustrated in FIG. 3, the user of the first communications device 304 may interact with the first communications device controller 308 associated with the first communications device 304 appropriately. For instance, the user may set the timer 312 to some amount of time slightly less than 20 minutes, for example, 19 minutes and 55 seconds and activate the autoredialer 310 function. Generally, the first communications device controller 308 and the associated autodialer 310 and timer 312 are implemented in software integral to or associated with software running on the first communications device 304. Alternatively, the first communications device controller 308 and the associated autoredialer 310 and timer 312 may be implemented in a device that is separate from the first communications device 304, and that is capable of controlling the first communications device 304 through, for example, external electrical contacts provided on the first communications device 304. The autoredialer 310 of the first communications device controller 308 may be set initially by the user, and automatically put into service each time the first communications device 304 is used. Alternatively, the amount of time accumulated by the timer 312 before communication with a second communications device 306 is terminated may be set during an initial setup of the controller 308, and operation of the autoredialer 310 selectively engaged before each call. As yet a further alternative, the timer 312 expiration time and the operation of the autoredialer 310 may be selected before a call is placed from the first communications device 304.

After the user has initialized the first communications device controller 308 as described above, a communication link may be established over the communications network 302 between the first 304 and second 306 communications devices. A telephone call or exchange of data may then proceed normally. Upon expiration of the time period set in the timer 312, the autoredialer 310 of the first communications device controller 308 may terminate the communication link across the communications network 302. The autoredialer 310 associated with the first communications device 304 may then initiate the establishment of a subsequent communication link across the communications network 302 with the second communications device 306. Where the second communications device 306 has associated with it a second communications device controller 314, notification of a request to establish the communications link may be suppressed, and the communications link between the devices 304 and 306 may be completed without intervention by the user. For example, where the second communications device 306 is a telephone, the device 306 may be placed off-hook automatically, and the normal ringing suppressed. Activation of the suppression of notification may occur automatically according to an in-band or out-of-band signal communicated from the first communications device controller 308 of the first communications device 304 to the second communications device controller 314 of the second communications device 306. Thus, the communications device controllers 308 and 314 may operate together to provide a virtually continuous connection between the communications devices 304 and 306, while minimizing or eliminating charges to the user of the first 304 and/or second 306 communications devices for use of the communications network 302.

As yet another embodiment, where the second communications device controller 314 includes an autoredialer and a timer, and where placing a call from a communications device 304 or 306 incurs a charge, but an incoming call is toll free, a call initiated by the first communications device 304 may be continued with a call from the second communications device 306 after the first communications link is disconnected. In this way, communications charges may be evenly distributed between charges billed to the user of the first communications device 304 and charges billed to the user of the second communications device 306. Where, for example, the communications network 302 does not charge for the first incoming minute of a telephone call, the cost of maintaining a connection between the devices 304 and 306 may be effectively halved.

Of course, various modifications to the systems described above can be contemplated. Such variations can be made without departing from the spirit and the scope of the invention and without diminishing its attendant advantages, and it is intended that such variations be covered by the appended claims.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A method of minimizing time-based communications system tolls, comprising:

establishing a connection between a first communications device and a second communications device over a communication link, wherein use of said communication link is charged for on a time of use basis, and wherein a first rate per unit of time is charged for a first time period, wherein a second rate per unit of time is charged for a second time period, and wherein said first rate is less than said second rate;

monitoring a connect time, wherein said connect time is an amount of time during which said connection is maintained;

generating a termination signal once said connect time is greater than or equal to a predetermined amount of time, wherein said predetermined amount of time is less than or equal to said first time period;

breaking said connection in response to said termination signal;

generating a reconnect signal after said step of breaking said connection; and re-establishing said connection in response to said reconnect signal.

2. The method of claim 1, further comprising suppressing a notification of a request to re-establish said connection.

3. The method of claim 1, wherein said step of establishing a connection is initiated by said first communications device, and wherein said step of reestablishing said connection is initiated by said second communications device.

4. The method of 1, wherein said first communications device is a telephone, and wherein said second communications device is a communications server.

5. The method of claim 1, wherein said predetermined amount of time is determined by a user.

6. The method of claim 1, further comprising:

monitoring a reconnect time, wherein said reconnect time is an amount of time during which said reestablished connection is maintained;

generating a termination signal once said reconnect time is greater than or equal to said predetermined amount of time, wherein said predetermined amount of time is less than or equal to said first time period; and breaking said re-established connection in response to said termination signal.

7. The method of claim 6, further comprising repeating said steps of re-establishing said connection, monitoring a reconnect time, generating a termination signal and breaking said re-established connection until a transfer of information is complete.

8. The method of claim 1, wherein said first communications device is selected from the group consisting of a telephone, a wireless telephone, a facsimile machine, a personal digital assistant, a personal computer and a pager.

9. The method of claim 1, wherein said second communications device is selected from the group consisting of a telephone, a wireless telephone, a communications server, a voice response server, a facsimile machine, a personal digital assistant, a personal computer and a pager.

10. A system for minimizing time based charges incurred for the use of communications channels, comprising:

a timer for monitoring an amount of time that a communication link over a communications network is in place between a first communications device and a second communications device;

a first controller for breaking said communication link between said first and said second communications devices after said timer indicates that a predetermined amount of time has elapsed and for generating a reconnect signal after breaking said communication link; and an autoredialer for reestablishing said communication link between said first and said second communications devices in response to said reconnect signal.

11. The system of claim 10, wherein said first communications device is selected from the group consisting of a telephone, a wireless telephone, a facsimile machine, a personal digital assistant, a personal computer and a pager.

12. The system of claim 10, wherein said first communications device is selected from the group consisting of a telephone, a wireless telephone, a voice response server, a communications server, a facsimile machine, a personal digital assistant, a personal computer and a pager.

13. The system of claim 10, further comprising:

a second controller for suppressing a notification of a request to reestablish a connection between said first and said second communications devices.

14. The system of claim 13, wherein said second controller is integral to said first communications device.

15. The system of claim 10, wherein said first communications device is a user communications device, and wherein said second communications device is a communications service.

16. The system of claim 10, wherein said communications network is the public switched telephony network.

17. An apparatus for breaking a communication link and reestablishing said link to minimize charges for using a communications network, comprising:

means for monitoring an amount of time that a communication link over a communications network has been established between a first communication device and a second communications device and for generating a termination signal after said communication link has been established for a predetermined amount of time;

means for disconnecting said communication link in response to said termination signal;

means for generating a reconnect signal; and means for reestablishing said communication link between said first and second communications device in response to said reconnect signal.

18. The apparatus of claim 17, further comprising means to answer and to suppress a notification of a request to establish communications between said first and second communications devices in at least a one of said communications devices.

19. The system of claim 17, wherein said first communications device is selected from the group consisting of a telephone, a wireless telephone, a personal digital assistant, a personal computer and a pager, and wherein said second communications device is selected from the group consisting of a voice response server, a unified communications server and an Internet server.

* * * * *